(12) United States Patent
N et al.

(10) Patent No.: US 11,811,509 B2
(45) Date of Patent: Nov. 7, 2023

(54) UPSTREAM MULTICAST HOP (UMH) EXTENSIONS FOR ANYCAST DEPLOYMENTS

(71) Applicant: Juniper Networks, Inc., Sunnyvale, CA (US)

(72) Inventors: Vinod Kumar N, Bangalore (IN); Robert W. Kebler, Newburyport, MA (US); Vikram Nagarajan, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 104 days.

(21) Appl. No.: 17/248,585

(22) Filed: Jan. 29, 2021

(65) Prior Publication Data

US 2022/0247585 A1 Aug. 4, 2022

(51) Int. Cl.
*H04L 12/18* (2006.01)

(52) U.S. Cl.
CPC .................. *H04L 12/18* (2013.01)

(58) Field of Classification Search
CPC ... H04L 12/18; H04L 12/185; H04L 12/1863; H04L 12/1886
USPC ........................................................ 370/390
See application file for complete search history.

(56) References Cited

U.S. PATENT DOCUMENTS

| 8,488,603 | B2 | 7/2013 | Zha et al. |
| 8,958,286 | B1 | 2/2015 | Atlas et al. |
| 8,995,275 | B1 * | 3/2015 | Iovine ............... H04L 45/16 370/252 |
| 9,843,513 | B2 | 12/2017 | Nagarajan et al. |
| 10,554,425 | B2 | 2/2020 | Kebler et al. |

(Continued)

FOREIGN PATENT DOCUMENTS

| CN | 1905530 A | 1/2007 |
| CN | 101369907 A | 2/2009 |

(Continued)

OTHER PUBLICATIONS

Extended Search Report from counterpart European Application No. 21170216.2 dated Oct. 14, 2021, 8 pp.

(Continued)

*Primary Examiner* — Nicholas P Celani
*Assistant Examiner* — Karina J Garcia-Ching
(74) *Attorney, Agent, or Firm* — Shumaker & Sieffert, P.A.

(57) ABSTRACT

An example egress network device includes at least one computer processor and a memory. The memory includes instructions that cause the at least one computer processor to receive messages from each of a plurality of ingress network devices. Each message specifies a multicast source as an anycast address that belongs to two or more sources, a multicast group, and a customer site identifier that uniquely identifies a customer network device via which the anycast address is reachable. The instructions cause the at least one computer processor to select, based on the customer site identifiers, one of the plurality of ingress network devices to which to send a multicast join message of a plurality of multicast join messages for the multicast source and multicast group. The instructions cause the at least one computer processor to send the multicast join message to the selected one of the plurality of ingress network devices.

20 Claims, 4 Drawing Sheets

(56) References Cited

U.S. PATENT DOCUMENTS

| | | | | |
|---|---|---|---|---|
| 2010/0046526 | A1* | 2/2010 | Kompella | H04L 45/00 370/395.53 |
| 2015/0288540 | A1* | 10/2015 | Kotalwar | H04L 61/5069 370/254 |
| 2019/0036717 | A1* | 1/2019 | Kebler | H04L 65/611 |
| 2019/0081996 | A1* | 3/2019 | Kebler | H04L 47/825 |

FOREIGN PATENT DOCUMENTS

| | | | |
|---|---|---|---|
| CN | 105991302 | A | 10/2016 |
| CN | 107276904 | A | 10/2017 |
| EP | 1045553 | | 10/2000 |
| EP | 3226491 | A1 | 10/2017 |

OTHER PUBLICATIONS

Filsfils et al., "Segment Routing Architecture," Internet Engineering Task Force (IETF), RFC 8402, Jul. 2018, 33 pp.

Filsfils et al., "Segment Routing Use Cases," draft-filsfils-spring-segment-routing-use-cases-01, Network Working Group, Internet-Draft, Oct. 21, 2014, 35 pp.

Filsfils et al., "Segment Routing Policy Architecture," draft-ietf-spring-segment-routing-policy-06.txt, SPRING Working Group, Internet-Draft, Dec. 14, 2019, 35 pp.

Previdi et al., "Source Packet Routing in Networking (SPRING) Problem Statement and Requirements," RFC 7855, Internet Engineering Task Force (IETF), May 2016, 19 pp.

Bashandy et al., "Segment Routing with the MPLS Data Plane," RFC 8660, Internet Engineering Task Force (IETF), Dec. 2019, 29 pp.

Rosen et al., "Multicast in MPLS/BGP IP VPNs," Internet Engineering Task Force (IETF), RFC 6513, Feb. 2012, 88 pp.

Aggarwal et al., "BGP Encodings and Procedures for Multicast in MPLS/BGP IP VPNs," RFC 6514, Internet Engineering Task Force (IETF), Feb. 2012, 59 pp.

Response to Extended Search Report dated Oct. 14, 2021, from counterpart European Application No. 21170216.2 filed Feb. 1, 2023, 28 pp.

Chen et al., "Study on nonobjective label aggregation for multicast in MPLS networks", Computer Engineering and Applications, vol. 43, No. 36, Dec. 2007, pp. 147-149.

First Office Action and Search Report from counterpart Chinese Application No. 202110437988.8 dated Feb. 22, 2023, 16 pp.

Yang et al., "Study on nonobjective label aggregation for multicast in MPLS networks", Computer Engineering and Applications, College of Computer Science, Chongqing University of Posts and Telecommunications, 2007, pp. 147-149, (Applicant points out, in accordance with MPEP 609.04(a), that the year of publication, 2007, is sufficiently earlier than the effective U.S. filing date, so that the particular month of publication is not an issue.).

* cited by examiner

UPSTREAM MULTICAST HOP (UMH) EXTENSIONS FOR ANYCAST DEPLOYMENTS

TECHNICAL FIELD

The disclosure relates to computer networks and, more particularly, to distribution of multicast traffic over computer networks.

BACKGROUND

A computer network is a collection of interconnected computing devices that exchange data and share resources. In a packet-based network, the computing devices communicate data by dividing the data into small blocks called packets. Certain devices within the network, such as routers and switches, maintain routing and/or forwarding information that describe paths through the network. In this way, the packets may be individually transmitted across the network from a source device to a destination device. The destination device extracts the data from the packets and assembles the data into its original form. Dividing the data into packets enables the source device to resend only those individual packets that may be lost during transmission.

Examples of computer networks include enterprise networks, branch networks, service provider networks, home networks, virtual private networks (VPNs), local area network (LANs), virtual LANs (VLANs) and the like. In any case, the computer networks may enable remotely located sources and receivers to share data. In some cases, the computer network may be configured to support multicast traffic, such as Internet Protocol Television (IPTV), desktop conferences, corporate broadcasts, music and video web casts, and other forms of multimedia content. For example, the computer network may utilize border gateway protocol (BGP) or protocol independent multicast (PIM) as a multicast routing protocol to build distribution trees through the computer network for the transmission of multicast traffic between sources and receivers within customer sites for particular multicast groups. In addition, the computer network may be configured to support multicast VPNs (MVPNs) to enable Internet Protocol (IP) multicast traffic to travel between sources and receivers within customer sites. For one or more MVPNs, provider edge (PE) routers coupled to the customer sites may conceptually build a multicast tree to carry multicast traffic from a multicast source through the public network so that the customer sites receive the multicast traffic as if the customer sites were directly attached to the same private network as the source.

SUMMARY

In general, this disclosure describes techniques for determining anycast paths for multicast traffic within a computer network. The disclosed techniques may be used to load balance among sources and/or to provide redundancy so as to avoid a situation where a primary feed and a backup feed for a multicast receiver are not both providing content from a single anycast source device. For example, if the primary feed and the backup feed both are providing content from a single source device and that single source device fails, a receiver may be without content for several seconds or minutes while a provider edge (PE) router attempts to switch the primary feed and/or the backup feed to routers connected to another source of the content.

For example, an egress PE router may use a BGP extended community attribute, e.g., a site of origin (SOO) attribute, carried in auto discovery messages, such as MVPN Type-1 and/or Type-5 routes, to determine which routers are connected to which sources and send multicast join messages accordingly to load balance between sources and/or avoid a situation where the primary feed and backup feed are from a same source device. In some examples, an ingress PE router may query a customer edge router connected to a source device to determine a unique identifier associated with the customer edge router, such as a customer edge router ID, and may advertise the unique identifier through the extended community attribute on auto discovery messages such as Type-1 and/or Type-5 routes sent to other PE routers in an MVPN. These advertisements eventually reach the egress PE router, which may use such information for load balancing and/or redundancy purposes.

In one example aspect, a method includes: receiving, by an egress network device for a network, messages from each of a plurality of ingress network devices for the network, wherein each of the messages specifies a multicast source as an anycast address that belongs to two or more different sources, a multicast group, and a customer site identifier that uniquely identifies a customer network device via which the anycast address is reachable; selecting, by the egress network device and based on the customer site identifiers specified by the messages, one of the plurality of ingress network devices to which to send a multicast join message of a plurality of multicast join messages for the multicast source and multicast group; and sending, by the egress network device, the multicast join message to the selected one of the plurality of ingress network devices.

In another example aspect, a network device includes at least one computer processor, and a memory comprising instructions that when executed by the at least one computer processor cause the at least one computer processor to: receive messages from each of a plurality of ingress network devices for the network, wherein each of the messages specifies a multicast source as an anycast address that belongs to two or more different sources, a multicast group, and a customer site identifier that uniquely identifies a customer network device via which the anycast address is reachable; select, based on the customer site identifiers specified by the messages, one of the plurality of ingress network devices to which to send a multicast join message of a plurality of multicast join messages for the multicast source and multicast group; and send the multicast join message to the selected one of the plurality of ingress network devices.

In a further example aspect, a non-transitory computer-readable storage medium is encoded with instructions that, when executed, cause at least one processor of a computing device to: receive messages from each of a plurality of ingress network devices for the network, wherein each of the messages specifies a multicast source as an anycast address that belongs to two or more different sources, a multicast group, and a customer site identifier that uniquely identifies a customer network device via which the anycast address is reachable; select, based on the customer site identifiers specified by the messages, one of the plurality of ingress network devices to which to send a multicast join message of a plurality of multicast join messages for the multicast source and multicast group; and send the multicast join message to the selected one of the plurality of ingress network devices.

The details of one or more examples of the disclosure are set forth in the accompanying drawings and the description

DETAILED DESCRIPTION

Customers using anycast deployments may desire to load balance between source devices multicasting anycast data so as not to overload network devices in a path between an egress PE router and an ingress PE router. Customers may also desire to have redundancy of sources, such that if one source goes down, ceases to send anycast data or experiences a degradation of service, an egress PE router may quickly switch from providing a primary stream to a backup stream without having to undergo additional search and/or setup functions to implement a new path to a new source device. However, because anycast source devices may advertise a same internet protocol (IP) address, an egress PE router may not be able to obtain information regarding which ingress PE router is associated with which source device in an anycast deployment. As a result, network operators may not be able to currently provide for such load balancing and/or redundancy.

According to the techniques of this disclosure, an egress PE router may utilize information contained in an extended community attribute, such as a site of origin (SOO) extended community attribute, to effect load balancing between different multicast source devices and/or to provide for redundancy to protect against one of the multicast source devices failing. For example, an ingress PE router may query a customer edge (CE) router to obtain a unique customer site identifier, such as a CE router ID. The ingress PE router may then advertise the unique customer site identifier in the extended community attribute in Type-1 and/or Type-5 routes. The egress PE router may use this information to load balance among two or more source devices and/or to ensure that a primary feed and a backup feed are not sourced from the same source device for redundancy purposes.

Figure 1:
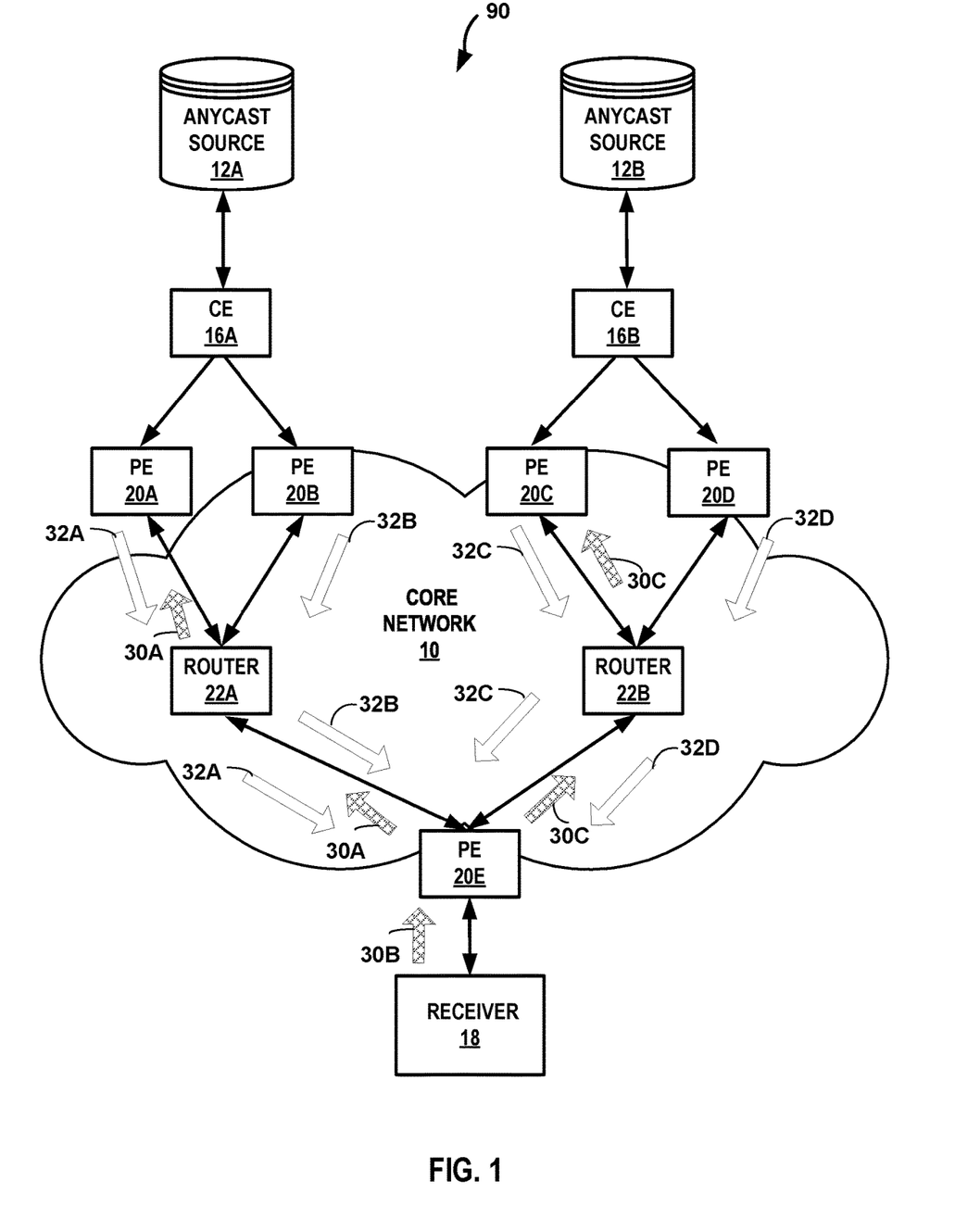
FIG. 1 is a block diagram illustrating an example computer network including two source devices configured to transmit multicast traffic to a multicast receiver according to the techniques of this disclosure.

FIG. 1 is a block diagram illustrating an example system including two multicast source devices configured to transmit anycast data to a multicast receiver according to the techniques of this disclosure. In the example of FIG. 1, core network 10 includes multiple provider edge (PE) routers 20A-20E and other network devices including provider routers (PR) 22A-22B. System 90 may include private networks or public networks, such as the Internet and core network 10. In some examples, system 90 include an enterprise network, a campus network, a service provider network, a home network, a local area network (LAN), a virtual local area network (VLAN), virtual private network (VPN), or another autonomous system. In some examples, system 90 may include multiple autonomous systems (ASes). In any of these examples, a remotely located anycast source device 12A and anycast source device 12B may share anycast data via ingress PE router 20A—ingress PE router 20D, routers 22A and 22B and egress PE router 20E with receiver 18. In some examples, core network 10 may be a multiprotocol label switching (MPLS) network.

Ingress PE router 20A is connected to anycast source device 12A via customer edge (CE) router 16A which may be located outside of system 90. Ingress PE router 20B is also connected to anycast source device 12A via CE router 16A. In this manner, anycast source device 12A and CE router 16A may be considered multi-homed. Similarly, ingress PE router 20C is connected to anycast source device 12B via CE router 16B which may be located outside of system 90. Ingress PE router 20D is also connected to anycast source device 12B via CE router 16B. In this manner, anycast source device 12B and CE router 16B may be considered multi-homed. In the example of FIG. 1, anycast source device 12A and anycast source device 12B are geographically separated to provide better redundancy. In some examples, anycast source device 12A and anycast source device 12B may have a same IP address and may provide the same unicast data or content.

Ingress PE routers 20A and 20B are linked to router 22A and ingress PE routers 20C and 20D are linked to router 22B. Both router 22A and router 22B are linked to egress PE router 20E which is linked (directly or indirectly) to receiver 18. Receiver 18 may be a multicast receiver configured to receive anycast traffic, such as IPTV traffic, and provide such traffic to a user for consumption. In some examples, receiver 18 may be external to system 90.

In the example of FIG. 1, ingress PE router 20A—ingress PE router 20D, egress PE router 20E, router 22A and router 22B may be devices that use multicast routing protocols, such as Protocol Independent Multicast (PIM) or Border Gateway Protocol (BGP), to route anycast traffic from anycast source device 12A and anycast source device 12B to receiver 18. In some examples, system 90 may include one or more multicast virtual private networks (MVPNs) to enable anycast traffic to travel between anycast source device 12A and receiver 18 and between anycast source device 12B and receiver 18. The MVPN(s) may be established between ingress PE routers 20A-20D and egress PE router 20E of system 90. When using the PIM protocol, the PIM protocol may operate in several different modes, including Dense Mode (DM), Sparse Mode (SM) in Source-Specific Multicast (SSM) mode or Any Source Multicast (ASM) mode, and Bidirectional (BIDIR) mode.

In some examples, any or each of anycast source device 12A, anycast source device 12B, and receiver 18 may be included in a remote site (not shown) that may be a local area network (LAN) or a wide area network (WAN) including a plurality of subscriber devices, such as desktop computers, laptops, workstations, PDAs, wireless devices, network-ready appliances, file servers, print servers or other devices. The remote sites may be configured to support anycast traffic, such as Internet Protocol Television (IPTV), desktop conferences, corporate broadcasts, music and video web casts, and other forms of multimedia content.

In some examples, system 90 may include unicast upstream multicast hop (UMH) and Selective Provider Tunnels (also referred to herein as "selective tunnels"). Inclusive Provider Tunnels (also referred to herein as "inclusive tunnels") may be configured on the PE routers, such that any multicast (e.g., anycast) packet that is sent by an ingress PE router into a network will be received by all the PE routers connected to the network for that MVPN irrespective of whether the PE routers have interested listeners (e.g., receivers). That is, when using inclusive provider tunnels an ingress PE router injects multicast (e.g., anycast) traffic in the MVPN by forwarding the traffic on all tunnels regardless of whether a receiver has expressly issued a multicast join request for the multicast source and group. In contrast, Selective Provider Tunnel mode may be configured on the PE routers such that traffic sent by a particular PE router is delivered to subset of PE routers in a given MVPN instance that have signaled interested receivers, rather than to all PE routers in the MVPN instance. This signaling of interest may be through multicast join messages, such as multicast join message 30A and 30C.

When a PE router receives a C-Join (Customer-Join) or C-Prune (Customer-Prune) message from a receiver, the message identifies a particular multicast flow as belonging either to a source-specific tree (S,G) or to a shared tree (*,G). The term "C-root," (Customer-Root), is used herein to refer to the multicast source S, in the case of a source-specific tree, or to the Rendezvous Point (RP) for G, in the case of (*,G). If the route to the C-root is across the VPN backbone network, then the PE router needs to find the "Upstream Multicast Hop" (UMH) for the (S,G) or (*,G) flow. The UMH is either the PE router at which (S,G) or (*,G) data packets enter the VPN backbone or the Autonomous System Border Router (ASBR) at which those data packets enter the local AS when traveling through the VPN backbone. The process of finding the upstream multicast hop for a given C-root is known as "upstream multicast hop selection."

Segment routing, which may also be referred to as source packet routing or source packet routing in networking (SPRING), is a control-plane architecture that enables an ingress router to steer a packet through a specific set of nodes and links in a network without relying on intermediate nodes in the network to determine the path it should take. In the example of FIG. 1, ingress PE router 20A and egress PE router 20E may use segment routing techniques, e.g., a SPRING paradigm, to advertise segments between nodes using an IGP or BGP and build single or multi-hop tunnels within system 90. Segment routing may engage IGPs or BGP for advertising multiple types of segments. A first example type of segment is an "adjacency segment" that represents a strict-forwarded, typically single-hop tunnel that carries packets over a specific link between a router and a specific node, irrespective of the link cost. A second example type of segment is a "prefix segment" that represents a typically multi-hop tunnel using least cost path links between a router and to a specific address prefix. A third example type of segment is a "binding segment" that represents a specific intra-domain tunnel between a router and a specific node or a specific address prefix.

In segment routing, the "path" information for segments is disseminated between the routers within system 90 as part of the IGP link state information for the respective area. Ingress PE router 20A is able to steer a packet through an ordered list of instructions or segments by prepending one or more segment identifiers (SIDs) to the packet. In other words, ingress router 20A can steer a packet through a desired set of nodes and links by prepending the packet with an appropriate combination (stack) of SIDs. Segment routing allows routers to enforce a flow through any topological path and service chain while maintaining per-flow state only at the ingress node to each domain.

Segment routing can be directly applied to the MPLS architecture with no change in the forwarding plane. A network administrator or centralized controller need only allocate SIDs to particular routers and the segment routing control plane architecture automatically builds the required MPLS forwarding constructs from a router to any other router. A SID is encoded as an MPLS label, and an ordered list of SIDs is encoded as a stack of labels. The SID of the segment to be processed is on the top of the stack and, upon completion of a segment, the related label is popped from the stack as the packet is forwarded through the network.

Segment routing is further described in Filsfils, et al., "Segment Routing Architecture," IETF RFC 8402, July 2018, while Segment Routing use cases are described in Filsfils, et al., "Segment Routing Use Cases," IETF Internet-Draft draft-filsfils-spring-segment-routing-use-cases-01, Oct. 21, 2014, each of which is incorporated herein by reference. Further details regarding SPRING are found in (1) Filsfils, et al., "Segment Routing Policy Architecture," IETF Internet-Draft draft-ietf-spring-segment-routing-policy-06, Dec. 14, 2019; (2) Previdi, et al., "Source Packet Routing in Networking (SPRING) Problem Statement and Requirements," IETF RFC 7855, May 2016; and (3) Bashandy, et al., "Segment Routing with MPLS data plane," IETF RFC 8660, December 2019. MVPN auto-discovery may be provided by a unicast routing protocol, such as BGP, used to discover and maintain MVPN memberships of PE routers within a network, such as system 90. BGP MVPN (sometimes referred to as "Next Generation (NG) MVPN") introduces a BGP control plane in the provider network for handling multicast traffic. As described in further detail below, PE routers 20A-20E may use BGP control plane messages ("routes") for coordinating delivery of the multicast traffic. BGP MVPN introduces the concept of Provider Multicast Service Interfaces (PMSI) to bring separation between the "service" and "transport" mechanisms. A PMSI is a conceptual "overlay" on the provider network (P-network) that refers to a "service." This "overlay" can take packets from one PE router belonging to a particular MVPN and deliver them to other or all the PE routers belonging to that same MVPN. BGP MVPN is responsible for three major functions: 1) Auto-discovery; 2) P-Tunnel Signaling; and 3) customer multicast (C-MCAST) Route Signaling. Auto-discovery is the process of finding all of the PE routers participating in a given MVPN instance. P-Tunnel signaling provides a way for PE routers to tell other PE routers what method they are going to use for transporting C-Multicast traffic (i.e., for establishing the PMSI tunnels). Options for establishing PMSI tunnels (which include inclusive provider tunnels and selective provider tunnels) include point-to-multipoint (P2MP) RSVP-TE, P2MP mLDP, multi-point-to-multipoint (MP2MP) mLDP, multicast Generic Routing Encapsulation (mGRE) or Ingress replication. C-MCAST Route Signaling is a way of exchanging C-Multicast control plane state, such as C-Join, C-Prunes and C-Register messages between relevant PE routers.

BGP MVPN uses selective provider tunnels, or selective provider multicast service interface (S-PMSI), and inclusive provider tunnels, or inclusive provider multicast service interface (I-PMSI). In selective provider tunnels (S-PMSI), traffic sent by a particular PE router is delivered to subset of PE routers in a given MVPN instance, rather than to all PE routers in the MVPN instance. Creating a selective provider tunnel enables an ingress PE router to move high-rate traffic off the inclusive tunnel and deliver the multicast traffic only to receivers that request it. This can improve bandwidth utilization.

PE routers participating in BGP MVPNs that use the BGP control plane use seven types of BGP MVPN routes (messages), five of which are used for auto-discovery and two for C-multicast protocol information exchange between PE routers. For example, PE routers 20 advertise their MVPN membership to other PE routers 20 using BGP, and PE routers 20 exchange BGP routing protocol messages to advertise various types of routes for controlling multicast distribution within the network.

For example, in a BGP MVPN, an MVPN Type-1 route is an intra-AS inclusive provider multicast service interface (I-PMSI) auto discovery (AD) route that is originated by all PE routers participating in an MVPN. That is, the MVPN Type-1 route is a type of auto discovery route. The MVPN Type-1 route includes a route type indicator, an originating router route distinguisher (RD), and an originating router loopback address. As described herein, an MVPN Type-1 route may also include an extended community attribute, such as a site of origin (SOO) extended community attribute, which may include a customer site identifier that uniquely identifies a customer network device, such as CE router 16A or CE router 16B, according to the techniques of this disclosure.

An MVPN Type-2 route is an inter-AS I-PMSI AD Route that is originated by all ASBR PE routers. The MVPN Type-2 route includes a route type indicator, an originating router RD, and an AS number of the originating ASBR.

An MVPN Type-3 route is a selective provider multicast service interface (S-PMSI) AD Route that is originated by the sender PE router (the sender PE router that initiates the S-PMSI). The MVPN Type-3 route includes a route type indicator, an originating router RD, Customer multicast Source address (C-S) Mask (32 for IPv4; 128 for IPv6), C-S Using S-PMSI, Customer multicast Group address (C-G) Mask (32 for IPv4; 128 for IPv6), C-G Using S-PMSI, and originating Router Loopback Address.

An MVPN Type-4 route is a leaf AD Route that is originated by receiver PE routers in response to receiving S-PMSI AD routes with the "leaf information required" flag set from the sender PE router. The MVPN Type-4 route includes a route type indicator, an S-PMSI AD route, and an originating router loopback address.

An MVPN Type-5 route is a source active AD Route that is originated by the PE router that discovers an active VPN multicast source. The MVPN Type-5 route is another type of auto discovery route. The MVPN Type-5 route includes a route type indicator, an originating router RD, C-S Mask (32 for IPv4; 128 for IPv6), Customer multicast Source address, C-G Mask (32 for IPv4; 128 for IPv6), Customer multicast Group address. As described herein an MVPN Type-5 route may also include an extended community attribute, such as an SOO extended community attribute, which may include a customer site identifier that uniquely identifies a customer network device, such as CE router 16A or CE router 16B, according to the techniques of this disclosure.

An MVPN Type-6 route is a shared tree join route that is originated by the receiver PE router (the PE router that receives a (C-*, C-G) join message from a VPN interface). The MVPN type 6 route includes a route type indicator, RD of Upstream PE router (towards Customer Rendezvous Point (C-RP)), AS Number of Upstream PE router (towards C-RP), C-RP Mask (32 for IPv4; 128 for IPv6), Customer Rendezvous Point Address, C-G Mask (32 for IPv4; 128 for IPv6), and Customer multicast Group address.

An MVPN Type-7 route is a source tree join route that is originated by the receiver PE router (the PE router that receives a local (C-S, C-G) join message or the PE router that already has a Type-6 route and receives a Type-5 route). The MVPN Type-7 route includes a route type indicator, RD of Upstream PE router (towards C-S), AS Number of Upstream PE router (towards C-S), C-S Mask (32 for IPv4; 128 for IPv6), Customer multicast Source Address, C-G Mask (32 for IPv4; 128 for IPv6), and Customer multicast Group address.

Additional information regarding MVPN may be found in Rosen, E., et al., "Multicast in MPLS/BGP IP VPNs," RFC 6513, February 2012, and Rosen, E., et al., "BGP Encodings and Procedures for Multicast in MPLS/BGP IP VPNs," RFC 6514, February 2012.

In the example of FIG. 1, ingress PE router 20A may have stored in memory a customer site identifier associated with CE router 16A. Ingress PE router 20A may advertise auto discovery routes (routes 32A), such as Type-1 routes and/or Type-5 routes, with an attached extended community attribute of SOO. For example, ingress PE router 20A may advertise Type-1 routes with PMSI tunnel type as "IR" and extended community attribute SOO specifying a customer site identifier that uniquely identifies CE router 16A associated with anycast source device 12A (such as the router ID of CE router 16A). Similarly, ingress PE router 20B may advertise Type-1 routes and/or Type-5 routes (routes 32B) with an attached extended community attribute of SOO specifying a customer site identifier that uniquely identifies CE router 16A associated with anycast source device 12A. Routes 32A and 32B may be forwarded by router 22A to egress PE router 20E.

Ingress PE router 20C may advertise Type-1 routes and/or Type-5 routes (routes 32C) with an attached extended community attribute of SOO. For example, ingress PE router 20C may advertise routes 32C with a community attribute SOO specifying a customer site identifier that uniquely identifies CE router 16B associated with anycast source device 12B. Similarly, ingress PE router 20D may advertise Type-1 routes and/or Type-5 routes (routes 32D) with an attached extended community attribute of SOO specifying a customer site identifier that uniquely identifies CE router 16B associated with anycast source device 12B. Routes 32C and 32D may be forwarded by router 22B to egress PE router 20E.

In some examples, the customer site identifier may include a customer edge site ID, a customer router ID, an AS number and site ID, or other identifier. Example customer site identifiers may include any of the following: soo:<Router ID>:<0>, soo:<AS Number>:<Site ID>, soo:10.10.10.10.0, or soo:100:1, or the like. In each case, the customer site identifier for CE router 16A may be different than the customer site identifier for CE router 16B.

Egress PE router 20E may determine which paths are associated with anycast source device 12A, based on the customer site identifier for CE router 16A in the extended community attribute SOO received in routes 32A and 32B. Additionally, egress PE router 20E may determine which paths are associated with anycast source 12B, based on the customer site identifier for CE router 16A in the extended community attribute SOO received in routes 32C and 32D.

Currently, next generation multicast virtual private network (NG-MVPN) upstream multicast hop (UMH) selection techniques include: 1) highest IP address; 2) unicast route (e.g., BGP best unicast route); 3) hash-based selection; 4) source active (SA) based UMH; and 5) static UMH which are described further below.

With NG-MVPN Live-Live (Multicast Stream Protection), egress PE router 20E would select a primary UMH and a backup UMH for anycast flows to send multicast join messages in order to provide redundancy of the flows. Anycast flows from the primary UMH and backup UMH may then be sent to egress PE router 20E. In some examples, egress PE router 20E may forward the primary anycast flows to receiver 18 and discard the backup anycast flows under normal operation. If the primary stream is interrupted for some reason or the rate of transmission drops below a predetermined threshold, egress PE router 20E may sense the interruption or rate drop and begin forwarding the backup flows rather than the primary flows. In this manner, any outage of content at receiver 18 may be relatively brief.

To select a UMH, receiver 18 may send a multicast join message. As can be seen in FIG. 1, there is more than one path that may be taken to reach a source device, such as anycast source device 12A or anycast source device 12B. Without provisioning, egress PE router 20E would select the highest IP address as that is the default according to the Internet Engineering Task Force (IETF) Request For Comments (RFC) 6513 standard. With provisioning, egress PE router 20E may use another of the five selection techniques mentioned above. For example, egress PE router 20E may use unicast route, which may select a feed with the best path (e.g., the best route according to a BGP best path selection algorithm). With a hashed-based determination technique, egress PE router 20E may select a path using a hash-based load balancing scheme that may load balance multicast join messages and thereby balance received multicast flows. Such a scheme aims to select a portion of content, such as half from one feed and another portion of content, such as the other half from another feed to avoid overloading certain network devices. With an SA based determination technique, egress PE router 20E may receive Type-5 routes from multiple or all upstream feeds and select the flows based on policies which may be configured on egress PE router 20E. With a static UMH determination technique, a network operator may statically provision the flows reaching egress PE router 20E.

In the case of internet protocol television (IPTV), with anycast sites, each anycast site may have the same IP address and push the same multicast content via flows. In some examples, anycast sites are geographically dispersed. For example, anycast source device 12A may be located in a separate physical location from anycast source device 12B, but anycast source device 12A and anycast source device 12B may both have the same IP address and push the same content, for example, the same 100 television channels. Anycast source device 12A and anycast source device 12B may be geographically separated for redundancy purposes. For example, if there is an incident, such as a power outage or fire, at the location of anycast source device 12A that causes anycast source device 12A to stop pushing traffic or go off-line, there may be a lower likelihood that anycast source device 12B would be similarly affected if anycast source device 12B is geographically separated from anycast source device 12A.

In some examples, it may be desirable to load balance between anycast sites. For example, network operators may require load balancing among anycast source device 12A and anycast source device 12B. However, current MVPN UMH techniques may not be capable of achieving load balancing between anycast sites. For example, if anycast source device 12A and anycast source device 12b are pushing content for the same 100 television channels, a network operator may desire that egress PE router 20E pull traffic for 50 television channels from anycast source device 12A and the other 50 television channels from anycast source device 12B to avoid overloading or reduce the likelihood of overloading any of the network devices, such as ingress PE routers 20A-20D or P 23A-23B.

In addition to load balancing or in lieu of load balancing, in some examples, a customer may require multicast stream protection (e.g., redundancy) at egress PE router 20E. For example, if egress PE router 20E selects a primary UMH path as being through ingress PE router 20A using any of existing UMH selection techniques and selects the backup UMH as ingress PE router 20B, when anycast source device 12A or CE router 16A fails (e.g., ceases to transmit traffic or otherwise does not meet transmission requirements), egress PE router 20E may experience the complete loss of anycast traffic until a control plane of egress PE router 20E converges to anycast source device 12B. This converging may take several seconds to several minutes. Thus, it may be desirable to ensure that a primary UMH and a backup UMH are site divergent, and thus also source divergent. For example, it may be desirable for egress PE router 20E to have one of anycast source device 12A or 12B as the primary UMH and the other of anycast source device 12A or 12B as the backup UMH. In some examples, both load balancing and redundancy may be achieved by selecting certain flows (e.g., television channels 1-50) from a first UMH as primary and other flows (e.g., television channels 51-100) from the first UMH as backup and the other flows (e.g., television channels 51-100) from a second UMH as primary and the certain flows (e.g., television channels 1-50) from the second UMH as backup. By using redundancy, if one of anycast source device 12A or 12B fails, egress PE router 20E (and thus receiver 18) may avoid lengthy content outages as egress PE 20E may forward content sent by the backup UMH.

In the example of FIG. 1, CE router 16A (and, therefore, anycast source device 12A) is multihomed to ingress PE router 20A and ingress PE router 20B. According to the techniques of this disclosure, rather than performing a hash-based selection to determine which ingress PE routers of ingress PE routers 20A-20D to send multicast join messages to, egress PE router 20E may, in effect, perform a hash-based selection to determine one of anycast source device 12A and anycast source device 12B to which to send multicast join messages. This may result in better load balancing and/or redundancy in system 90. However, currently, an egress router in an MVPN has visibility to the ingress PE routers through their advertisements, but not to the CE routers or to the anycast source devices. Therefore, absent the techniques of this disclosure, an egress PE router may not be able to determine which anycast source device is connected to which ingress PE router.

For example, with respect to redundancy, if egress PE router 20E were to send a multicast join message to ingress PE router 20A for primary flows and a multicast join message to ingress PE router 20B for backup flows, egress PE router 20E would end up receiving all the anycast traffic from anycast source device 12A. In such a case, if anycast source device 12A or CE router 16A goes down, egress PE router 20E may take several seconds or several minutes to switch the primary UMH and/or the secondary UMH over to anycast source device 12B before egress PE router 20E (and receiver 18) may start receiving content again. This means a user of receiver 18 may be without content for a period of time that may not be acceptable to that user. In some examples, it may be desirable to keep any switching time between flows providing content to be under 50 ms. Therefore, it may be desirable to ensure the primary UMH anycast source device and the secondary UMH anycast source device are different from each other.

According to the techniques of this disclosure, messages from each ingress PE router 20A-20D (e.g., BGP MVPN auto discovery messages, such as Type-1 and/or Type-5 routes) may include an extended community attribute specifying a customer site identifier that uniquely identifies a customer network device via which the anycast IP address is reachable. For example, an MVPN module executing on ingress network device 20A may query a PE-CE protocol (e.g., BGP/IGP) executing on the ingress network device 20A to obtain a customer site ID, e.g., a CE router ID, such as an identifier CE router 16A in the example of FIG. 1. The MVPN module may then tag MVPN Type-1 (Intra-AS AD) routes and/or Type-5 (SA AD) routes with the customer site identifier (e.g., CE router ID). For example, the MVPN may use a site of origin (SOO) extended community attribute field to carry this value. For example, soo:<CE Router ID>:<0>.

Alternatively, an administrator may provision the SOO on each MVPN PE router. In this example as well, the MVPN module on each ingress PE router may tag MVPN Type-1 (Intra-AS AD) routes and/or Type-5 (SA AD) routes with the SOO extended community. For example, an SOO of format soo:<AS Number>:<Site ID> may be tagged.

In some examples, Type-1/Type-5 routes associated with anycast source device 12A (e.g., routes 32A from ingress PE router 20A and routes 32B from ingress PE router 20B) may carry soo:10.10.10.10:0 and Type-1/Type-5 routes associated with anycast source device 12B (e.g., routes 32C from ingress PE router 20C and routes 32D from ingress PE router 20D) may carry soo:20.20.20.20:0.

Alternatively Type-1/Type-5 routes associated with anycast source device 12A (e.g., routes 32A from ingress PE router 20A and routes 32B from ingress PE router 20B may carry soo:100:1 and Type-1/Type-5 routes associated with anycast source device 12B (e.g., routes 32C from ingress PE router 20C and routes 32D from ingress PE router 20D) may carry soo:100:2.

These specific examples of the SOO are described for purposes of example, and other examples may exist which would still fall within the scope of this disclosure.

By tagging each of the Type-1 routes and/or the Type-5 routes with the SOO indicative of the CE router (and thereby indicative of the anycast source device) providing content to a given PE router, egress PE router 20E may be enabled to determine the anycast source device providing content to each of the PEs (e.g., ingress PE routers 20A-20D). In this way, the PE routers 20 use the CE router ID as a proxy for a source identifier. If two ingress PE routers advertise the same customer site ID, the egress PE router can determine they are receiving the anycast content from the same source. If two ingress PE routers advertise different customer site IDs, the egress PE router can determine they are receiving anycast traffic from different sources.

Egress PE router 20E may store, in memory, the customer site identifier associated with each ingress PE routers 20A-20D along with an indication of the associations.

For example, egress PE router 20E may employ UMH procedures which may be extended to hash multicast join messages based on the customer site identifier that uniquely identifies a customer network device (e.g., CE router ID) via which the anycast address is reachable. For example, ingress PE router 20A may perform a BGP or IGP obtain of a CE router 16A router ID which may be associated with anycast source device 12A. Now ingress PE router 20A may store in memory the router ID of CE router 16A which is associated with anycast source device 12A. Ingress PE router 20A may then advertise the router ID of CE router 16A via an SOO extended community attribute via ingress PE router 20A's Type-1 and/or Type-5 routes (routes 32A). Similarly, each connected MVPN ingress PE router may determine a CE router ID of a connected CE router, store the CE router ID and provide the CE router ID through Type-1 and/or Type-5 routes to all connected MVPN PE routers, such as egress PE router 20E. In this manner, egress PE router 20E may be able to determine which ingress PE routers in the MVPN are on a path to anycast source device 12A and which are on a path to anycast source device 12B. In some examples, rather than ingress PE router 20A obtaining the CE router ID from anycast source device 12A, a network operator may statically provision the CE router ID from anycast source device 12A in ingress PE router 20A.

For example, now egress PE router 20E may hash 50 multicast join messages [(S1,G1) . . . (S1,G50)] to anycast source device 12A and another 50 multicast join messages [(S1,G51) . . . (S1,G100)] to anycast source device 12B. In the example of FIG. 1, each of anycast source device 12A and anycast source device 12B has two connected UMH ingress PE routers. In some examples, the multicast join messages are further hashed between these two UMH ingress PE routers.

According to the techniques of this disclosure, an egress PE router, such as egress PE router 20E may employ an enhanced hash algorithm. For example, the upstream anycast source devices in a source candidate list may be numbered from lowest to highest customer site identifier (e.g., CE router ID), starting from 0. For example, egress PE router 20E may number CE router 16A as 0 and may number CE router 16B as 1. If there were a third customer site, egress PE router 20E may number the third customer site identifier as 2, and so on. Egress PE router 20E may perform a bytewise-exclusive-or(XOR)-hash as defined in RFC 6513 of all bytes in C-root address and C-G address. Egress PE router 20E may take the results of the bytewise-XOR-hash and perform a modulo n operation, where n is the number of unique upstream customer site identifiers in the source candidate list (e.g., 2 in the example of FIG. 1). For example, egress PE router 20E may take the result of the hash function modulo n to determine an index number. In some examples, if the result of the modulo n operation is N (e.g., the index number), the selected upstream customer site is the customer site that appears in position N of above list. For example, egress PE router 20E may select one of the one or more of the plurality of ingress network devices to which to send a multicast join message based on the index number.

In some examples, egress PE router 20E may further hash the multicast join messages to UMH ingress PE routers in the selected upstream source device path as follows. Egress PE router 20E may number the upstream ingress PE routers in a source candidate list from lowest to highest IP address, starting from 0. Egress PE router 20E may perform a bytewise-XOR-hash of all bytes in C-root address & C-G address. Egress PE router 20E may take the results of the bytewise-XOR-hash and perform a modulo m operation, where m is the number of upstream ingress PE routers in the source candidate list. For example, egress PE router 20E may take the result of the hash function modulo m to determine a second index number (e.g., 2 in the example of FIG. 1). If the result of the modulo m operation is M (e.g., a second index number), the selected upstream ingress PE router is the one that appears in position M of the above list. For example, egress PE router 20E may select one of the one or more of the plurality of ingress network devices to which to send a multicast join message based on the second index number.

As egress PE router 20E now has stored which ingress PE routers are connected to (or associated with) which CE routers, egress PE router 20E may select a primary path through an ingress PE router that leads to one anycast source device, such as anycast source device 12A, and a backup path through an ingress PE router that leads to another source device, such as anycast source device 12B. For example, egress PE router 20E may use the above-mentioned mentioned hashing algorithm to determine where to send multicast join messages. For example, egress PE router 20E may create list of CE routers associated with anycast source devices, such as CE router 16A and CE router 16B, and number CE router 16A as 0, and CE router 16B a 1, and so on. The above-referenced hashing algorithm may be used to determine where to send the multicast join messages. In some examples, the process may be repeated for every multicast join message received by egress PE router 20E.

In deployments which require Multicast Stream Protection on the egress PE router (e.g., egress PE router 20E), backup UMH procedures can be extended as follows. For example, egress PE router 20E may send two multicast join message per flow—one for a primary flow and one for a backup flow. Egress PE router 20E may obtain from memory the customer site identifier (e.g., the router ID of CE router 16A) associated with the primary UMH (e.g., ingress PE router 20A) or extract the customer site identifier from routes 32A. Egress PE router 20E may scan a source candidate list to identify all UMHs having the same customer site identifier as that of primary UMH. Egress PE router 20E may trim the source candidate list to remove all UMHs that have the same customer site identifier (which may indicate they are coupled to same customer site as that of primary UMH). Egress PE router 20E may then execute procedures to select a backup UMH from trimmed source candidate list. For example, egress PE router 20E may uses existing procedures to select the backup ingress PE router from the trimmed source candidate list, such as highest IP address, SA based UMH, or second-best unicast route, among others. This technique may ensure that a primary flow and a backup flow are from different anycast source devices (e.g., one from anycast source device 12A and one from anycast source device 12B) and therefore bring redundancy between the anycast source devices to address the possibility of an anycast source device failure or a CE router failure within a particular customer site.

The techniques of this disclosure are applicable to Intra-AS (autonomous systems) and Inter-AS multi-homed BGP-MVPN deployments. These techniques may utilize multicast traffic hashing (e.g., load balancing) based on customer site identifiers in anycast deployments. These techniques may provide maximally redundant multicast trees that provide protection against multicast source failures in anycast deployments. In accordance with the techniques of this disclosure, no changes in forwarding constructs are needed in a BGP-MVPN PE router as the problems this disclosure addresses are handled in a control plane. These techniques may be used for IPv4 and/or IPv6 multicast and for all BGP-MVPN UMH devices. In some examples, the techniques of this disclosure are applicable to other multicast deployments other than MVPN. For example, the techniques of this disclosure may be used for any multicast deployment. In some examples, the techniques of this disclosure may be used with an Ethernet VPN. In some examples, the techniques of this disclosure may be used with broadcast, unknown unicast and multicast traffic. In some examples, the techniques of this disclosure may be used with a Rosen-MVPN. In some examples, the techniques of this disclosure may be used with a PIM network with a field in a PIM message carrying the customer site identifier. In some examples, an IGP or BGP unicast route may carry the customer site identifier.

Figure 2:
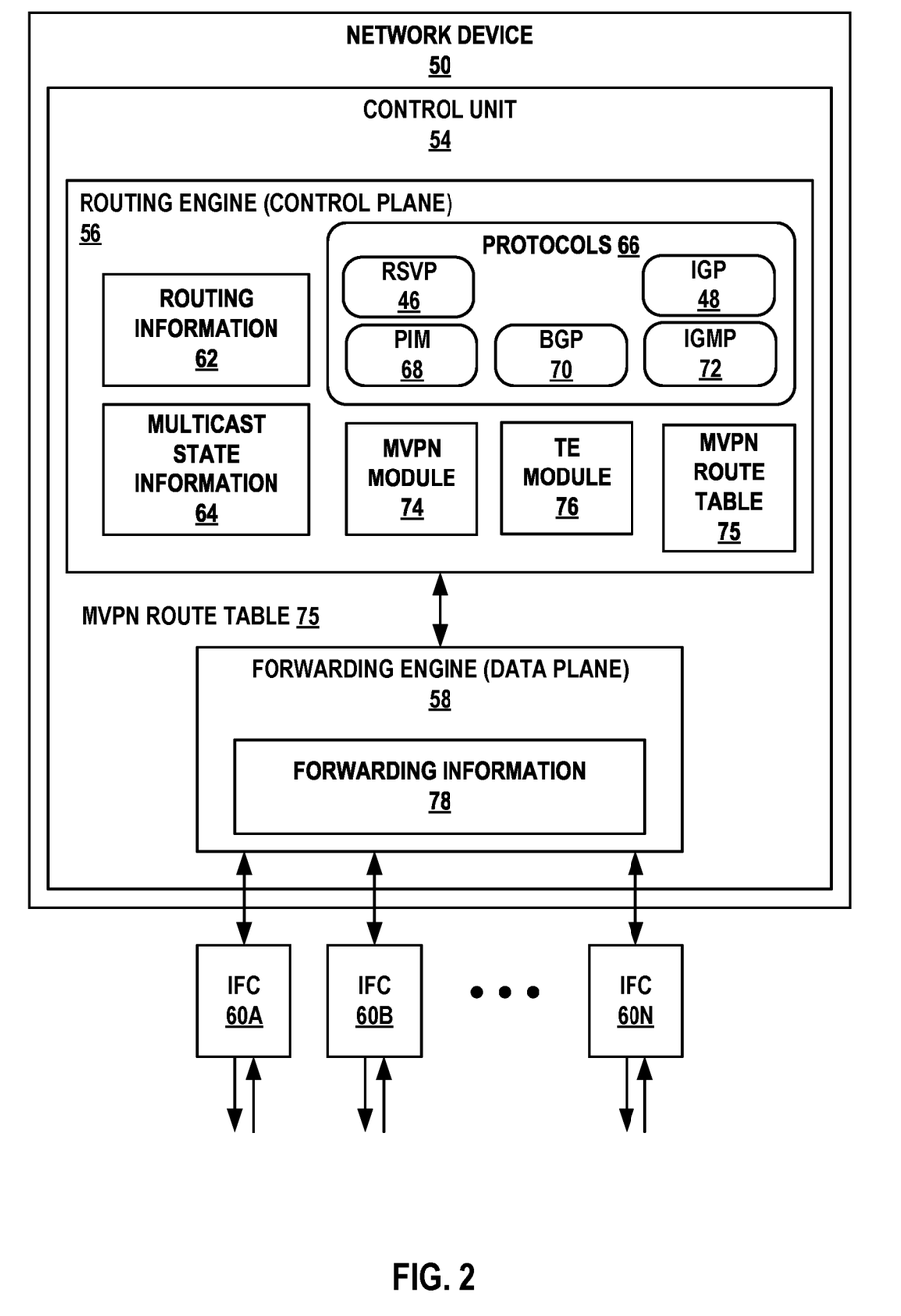
FIG. 2 is a block diagram illustrating an example network device configured to operate in accordance with techniques of this disclosure.

FIG. 2 is a block diagram illustrating an example network device 50 configured to operate in accordance with techniques of this disclosure. In one example, network device 50 may operate as an ingress network device to a network, such as an MPLS network. In another example, network device 50 may operate as an egress network device. According to the disclosed techniques, in the example where network device 50 is an ingress network device, network device 50 is configured to determine a customer site identifier, such as a CE router ID, associated with a source device, such as anycast source device 12A and advertise the customer site identifier via Type-1 and/or Type-5 routes as a BGP extended community attribute, such as SOO. As an ingress network device, network device 50 may operate substantially similarly to ingress PE routers 20A-20D of FIG. 1.

According to the disclosed techniques, in the example where network device 50 is an egress network device, network device 50 is configured to receive messages from each of a plurality of ingress network devices for the network, wherein each of the messages specifies a multicast source as an anycast address that belongs to two or more different sources, a multicast group, and a customer site identifier that uniquely identifies a customer network device via which the anycast address is reachable. Network device 50 is also configured to select, based on the customer site identifiers specified by the messages, one of the plurality of ingress network devices to which to send a multicast join message of a plurality of multicast join messages for the multicast source and multicast group. Network device 50 is further configured to send the multicast join message to the selected one of the plurality of ingress network devices. In such a case, network device 50 may operate substantially similarly to egress PE router 20E of FIG. 1.

In the illustrated example of FIG. 2, network device 50 includes interface cards 60A-60N ("IFCs 60") that receive control and data packets via incoming links and send control and data packets via outbound links. IFCs 60 are typically coupled to the incoming links and the outbound links via a number of interface ports. Network device 50 also includes a control unit 54 that determines routes of received packets and forwards the packets accordingly via IFCs 60.

Control unit 54 includes a routing engine 56 and a forwarding engine 58. Routing engine 56 operates as the control plane for router 50 and includes an operating system (not shown) that may provide a multi-tasking operating environment for execution of a number of concurrent processes. For example, routing engine 56 provides an operating environment for various protocols 66 that perform routing functions for network device 50. In the illustrated example of FIG. 2, routing engine 56 includes a BGP 70 as a unicast routing protocol used to exchange routing information, with other network devices in a network in order to discover the network topology and update routing information 62, and sending routes for MVPN auto-discovery, provider tunnel signaling, and customer multicast route signaling. BGP 70 may also be used to exchange extended community attributes, such as SOO between network device indicating a customer site identifier that uniquely identifies a customer network device via which the anycast address is reachable. In addition, protocols 66 of routing engine 56 includes RSVP 46 used to exchange bandwidth reservation information and labels to build RSVP tunnels, IGP 48 used to exchange link state information along with labels and/or SIDs to build SR tunnels and PIM 68 as a multicast routing protocol used to build multicast distribution trees with the other network devices in the network using routing information 62 and multicast state information 64.

Protocols 66 of routing engine 56 also includes internet group management protocol (IGMP) 72 as a communications protocol used to establish multicast group memberships with IGMP hosts, e.g., receivers and sources, within customer sites external to the network. In some examples, routing engine 56 may receive IGMP report messages identifying a multicast group and, in some cases, a source of the multicast group in which an IGMP host is interested. Routing engine 56 may, in some examples, use PIM 68 to generate the multicast control messages (e.g., PIM join messages and/or PIM prune messages) used to build the multicast distribution trees in the network.

Routing information 62 may describe the topology of the network in which network device 50 resides, and may also describe various routes within the network and the appropriate next hops for each route, i.e., the neighboring network devices along each of the routes. Routing information 62 may include a list of incoming interfaces (IIFs) and a list of outgoing interfaces (OIFs) that indicate which of IFCs 60 are connected to the neighboring network devices in each route. For example, a given route may comprise a multicast route for multicast traffic of a given multicast group. In that example, the list of IIFs included in routing information 62 may include a list of upstream interfaces for all upstream neighbor network devices that have state for the given multicast group, and the list of OIFs included in routing information 62 may include a list of downstream interfaces for all downstream neighbor network devices that have state for the given multicast group. Multicast state information 64 may describe a current status of interfaces for the neighboring network devices in the multicast distribution trees established using PIM 68. For example, multicast state information 64 may include multicast state (e.g., PIM join state and PIM prune state) for each different multicast group within a range for a given multicast distribution tree. More specifically, for each multicast group, multicast state information 64 may include upstream and downstream interfaces toward neighboring network devices that belong to the respective multicast group.

MVPN module 74 may be configured to establish and maintain MVPN distribution trees or tunnels within the network using one or both of PIM 68 and BGP 70. For example, MVPN module 74 may signal TE module 76 to initiate establishment of TE tunnels, such as SR-TE tunnels, RSVP-TE tunnels, or other tunnels. MVPN module 74 may contain MVPN route table 75 which may include a list indicative of which customer site identifiers are associated with which links or with which ingress PE routers.

Forwarding engine 58 may receive BGP messages and may forward received messages to MVPN module 74 for processing. In addition, MVPN module 74 may map MVPN membership information of other network devices within the network and generate multicast state for a given MVPN based on the MVPN membership information. In some examples, MVPN module 74 may store multicast state for one or more MVPNs in multicast state information 64.

Routing engine 56 analyzes routing information 62 and multicast state information 64 to generate forwarding information 78 installed in forwarding engine 58. Forwarding engine 58 provides data plane functionality for network device 50. Although not shown in FIG. 2, forwarding engine 58 may comprise a central processing unit (CPU), memory and one or more programmable packet-forwarding application-specific integrated circuits (ASICs). Forwarding information 78 associates network destinations with specific next hops and corresponding ports of IFCs 60.

According to the techniques of this disclosure, network device 50 is configured such that when network device 50 receives a Type-1 route (and/or a Type-5 route) having an extended community attribute SOO, network device 50 determines the customer site identifier within the extended community attribute SOO attached to the Type-1 (and/or Type-5) route. Network device may then store the SID, ingress PE router ID or other information associated with the received route and the customer site identifier in MVPN route table 75, thereby storing an association between the ingress PE router and the customer site identifier. When network device 50 queries a CE router to obtain a customer site identifier, such as in some examples where network device 50 is an ingress network device, network device 50 may store the customer site identifier and, in some examples, other information associating the customer site identifier with the CE router, such as the link or port of network device 50 that is coupled to the CE router, an IP address associated with the CE router, or the like, in MVPN route table 75. While MVPN route table 75 is shown outside of routing information 62, in some examples, MVPN route table 75 may be part of routing information 62. Further details of MVPN module 74 are described with respect to FIG. 3.

The architecture of network device 50 illustrated in FIG. 2 is shown for example purposes only and should not be limited to this architecture. In other examples, network device 50 may be configured in a variety of ways. In one example, some of the functionally of control unit 54 may be distributed within IFCs 60. Control unit 54 may be implemented solely in software, or hardware, or may be implemented as a combination of software, hardware, or firmware. For example, control unit 54 may include one or more processors which execute software instructions. In that case, the various software modules of control unit 54 may comprise executable instructions stored on a computer-readable medium, such as computer memory or hard disk.

Figure 3:
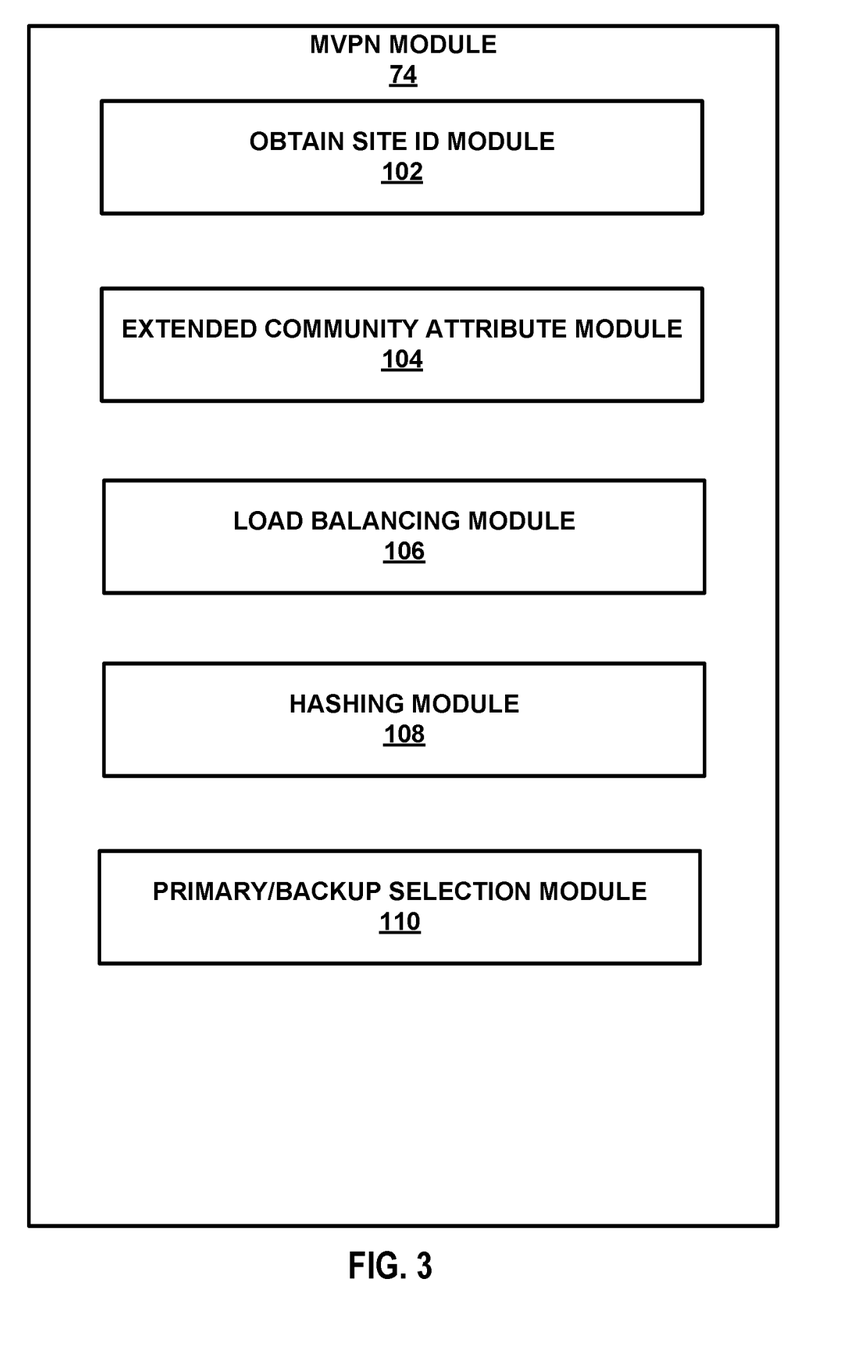
FIG. 3 is a block diagram illustrating an example multicast virtual private network (MVPN) module of a network device according to the techniques of this disclosure.

FIG. 3 is a block diagram of an example MVPN module of a network device according to the techniques of this disclosure. In the example of FIG. 3, MVPN module 74 includes obtain site ID module 102, extended community attribute module 104, load balancing module 106, hashing module 108, primary/backup selection module 110, and MVPN route table 75. In some examples, MVPN module 74 may contain fewer or more modules. For example, if network device 50 is not an MVPN ingress PE, MVPN module 74 may not include obtain site ID module 102.

Obtain site ID module 102 may be used by network device 50 to obtain a customer site identifier that uniquely identifies a customer site or a customer network device. In some examples, obtain site ID module 102 may obtain a CE router ID that may uniquely identify the CE router. For example, obtain site ID module 102 may query PE-CE protocol (e.g., BGP 70 or IGP 48 of FIG. 2) to obtain a customer site identifier, for example, a CE router ID. In this manner, obtain site ID module may obtain the customer site identifier.

Obtain site ID module 102 may store the obtained customer site identifier in MVPN route table 75. In some examples, obtain site ID module 102 may also store additional information associated with the customer site identifier, such as the link or port of network device 50 that is associated with the customer site identifier, an IP address associated with the customer site identifier, or the like. Alternatively, or in addition, obtain site ID module 102 may store the customer site identifier in another data structure accessible to extended community attribute module 104.

Extended community attribute module 104 may use BGP 70 to advertise via the extended community attribute SOO the stored customer site identifier over Type-1 and/or Type-5 routes. For example, extended community attribute module 104 may send auto discovery messages (e.g., Type-1 and/or Type-5 routes) that specify a multicast source as an anycast address. The anycast address may belong to two or more different sources, such as anycast source device 12A and anycast source device 12B of FIG. 1. The messages may also specify a multicast group, such as a particular MVPN, and the customer site identifier. These messages may be forwarded by network devices to an egress network device, such as egress PE router 20E of FIG. 1.

An egress network device (e.g., egress PE router 20E) for a network may receive messages from each of a plurality of ingress network devices for the network (e.g., ingress PE routers 20A-20D of FIG. 1). Each of the messages may specify a multicast source as an anycast address that belongs to two or more different sources, a multicast group, and a customer site identifier that uniquely identifies a customer network device via which the anycast address is reachable.

Extended community attribute module 104 of the egress network device may extract the customer site identifiers from the messages and store the customer site identifiers along with other information such as the SID, ingress PE router ID associated with a particular received message and the associated customer site identifier in MVPN route table 75, thereby storing an association between a particular ingress PE router and a unique customer site identifier.

Load balancing module 106 may be used by network device 50, when network device 50 is an egress network device, to load balance flows between different anycast source devices and, in some examples, ingress network devices. For example, load balancing module 106 may employ an enhanced hash algorithm on multicast join messages received from a multicast receiver to determine to which CE routers or which ingress network devices to send the multicast join messages. The join messages may be PIM join messages. For example, in response to receiving a multicast join message, load balancing module 106 may determine a source candidate list based on the customer set identifiers (e.g., a list of CE routers delivering anycast flows) specified by auto discovery routes received from ingress PE routers. Load balancing module 106 may number each candidate in the source candidate list from lowest to highest customer site identifier (e.g., CE router ID), starting from 0. Load balancing module 106 may interact with hashing module 108 to perform a bytewise-XOR-hash as defined in RFC 6513 of all bytes in C-root address and C-G address of a given multicast join message. Hashing module 108 may take the results of the bytewise-XOR-hash and perform a modulo n operation, where n is the number of unique upstream customer site identifiers in the source candidate list (e.g., 2 in the example of FIG. 1). For example, hashing module 108 may take the result of the hash function modulo n to determine an index number. In some examples, if the result of the modulo n operation is N (e.g., the index number), the selected upstream customer site is the customer site associated with the customer site identifier that appears in position N of above list. For example, hashing module 108 may select one of the one or more of the plurality of ingress network devices to which to send the received multicast join message based on the index number. Hashing module 108 may notify load balancing module 106 of the selected upstream customer site for the given multicast join message.

In some examples, load balancing module 106 may further use hashing module 108 to select a particular ingress PE network device to which to send the multicast join message rather than just any ingress network device associated with the customer site identifier. For example, load balancing module 106 may determine a second source candidate list of each ingress network device associated with the selected customer site identifier (e.g., ingress PE router 20A and ingress PE router 20B of FIG. 1 associated with the customer site identifier for CE router 16A). Load balancing module 106 may number each ingress network device in the source candidate list from lowest to highest IP address, starting from 0. Load balancing module 106 may interact with hashing module 108 to perform a bytewise-XOR-hash as defined in RFC 6513 of all bytes in C-root address and C-G address of the given multicast join message. Hashing module 108 may take the results of the bytewise-XOR-hash and perform a modulo m operation, where m is the number of ingress network devices in the source candidate list (e.g., 2 in the example of FIG. 1). For example, load balancing module 106 may take the result of the hash function modulo m to determine a second index number. In some examples, if the result of the modulo m operation is M (the second index number), the selected ingress network device is the ingress network device that appears in position M of above list. For example, hashing module 108 may select one of the one or more of the plurality of ingress network devices to which to send a multicast join message based on the second index number. Hashing module 108 may notify load balancing module 106 of the selected ingress network device for the given multicast join message.

Load balancing module 106 may direct the given multicast join message towards the selected ingress network device or CE router associated with the customer site identifier by interacting with other modules of network device 50. Load balancing module 106 may repeat this process for each received multicast join message.

Primary/backup selection module 110 may be used by network device 50, when network device 50 is an egress network device, to determine a primary flow and a backup flow for a given multicast join message to provide redundancy for the flow in case there is an interruption of the flow or a degradation of the flow. For example, primary/backup selection module 110 may employ an enhanced hash algorithm on multicast join messages received from a multicast receiver to determine to which CE routers or which ingress network devices to send a copy of the multicast join message. Once the CE routers or ingress network devices are selected, primary/backup selection module 110 may direct a copy of the multicast join message to both the CE router or ingress network device selected for the primary flow and the CE router or ingress network device selected for the backup flow.

For example, primary/backup selection module 110 may determine a source candidate list based on the customer set identifiers (e.g., a list of CE routers delivering anycast flows). Primary/backup selection module 110 may number each candidate in the source candidate list from lowest to highest customer site identifier (e.g., CE router ID), starting from 0. Primary/backup selection module 110 may interact with hashing module 108 to perform a bytewise-XOR-hash as defined in RFC 6513 of all bytes in C-root address and C-G address of a given multicast join message. Hashing module 108 may take the results of the bytewise-XOR-hash and perform a modulo n operation, where n is the number of unique upstream customer site identifiers in the source candidate list (e.g., 2 in the example of FIG. 1). For example, hashing module 108 may take the result of the hash function modulo n to determine an index number. In some examples, if the result of the modulo n operation is N (the index number), the selected primary upstream customer site is the customer site associated with the customer site identifier that appears in position N of above list. Hashing module 108 may notify load balancing module 106 of the selected upstream primary customer site for the given multicast join message. In some examples, primary/backup selection module 110 and hashing module 108 may select a primary ingress network device rather than a primary customer site for the given multicast join message in a similar manner to the selection of the ingress network device by load balancing module 106 and hashing module 108 discussed above. Primary/backup selection module 110 may store an indication of which customer site (e.g., CE router) or ingress network device is selected as primary for a given flow, for example, in MVPN route table 75.

Primary/backup selection module 110 may then scan through the source candidate list and trim the source candidate list by removing any candidates having the same customer site identifier as that of the selected upstream primary customer site. Primary/backup selection module 110 may then use any existing procedures to select a backup flow from the remaining candidates in the source candidate list, such as highest IP address, SA based UMH, or 2nd best unicast route, among others. By removing the candidates from the source candidate list that have the same customer site identifier as that of the selected upstream primary customer site for a given flow, primary/backup selection module 110 may ensure that the backup customer site and the backup ingress network device are different than the primary customer site for that given flow. Primary/backup selection module 110 may store an indication of which customer site or ingress network device is selected as backup for the given flow, for example, in MVPN route table 75. When the primary and backup flow are received by network device 50, primary/backup selection module 110 may determine which flow is primary and/or which flow is backup, for example, by looking up a stored indication(s) in MVPN route table 75, and forward the primary flow towards receiver 18 and discard the secondary flow. When an outage or degradation of service on the primary flow occurs, primary/backup selection module 110 may make the backup the primary and store an indication of the change, e.g., in MVPN route table 75. Primary/backup selection module 110 may then determine a backup for the flow according to any of the techniques described herein or may make the former primary flow, the backup flow. In some examples, an MVPN module 74 may include load balancing module 106 but may not include primary/backup selection module 110, or vice versa. In this respect, each of modules 106 and 110 can, if desired, operate independently of each other in a standalone manner, in a device that does not include the other one of the modules.

Figure 4:
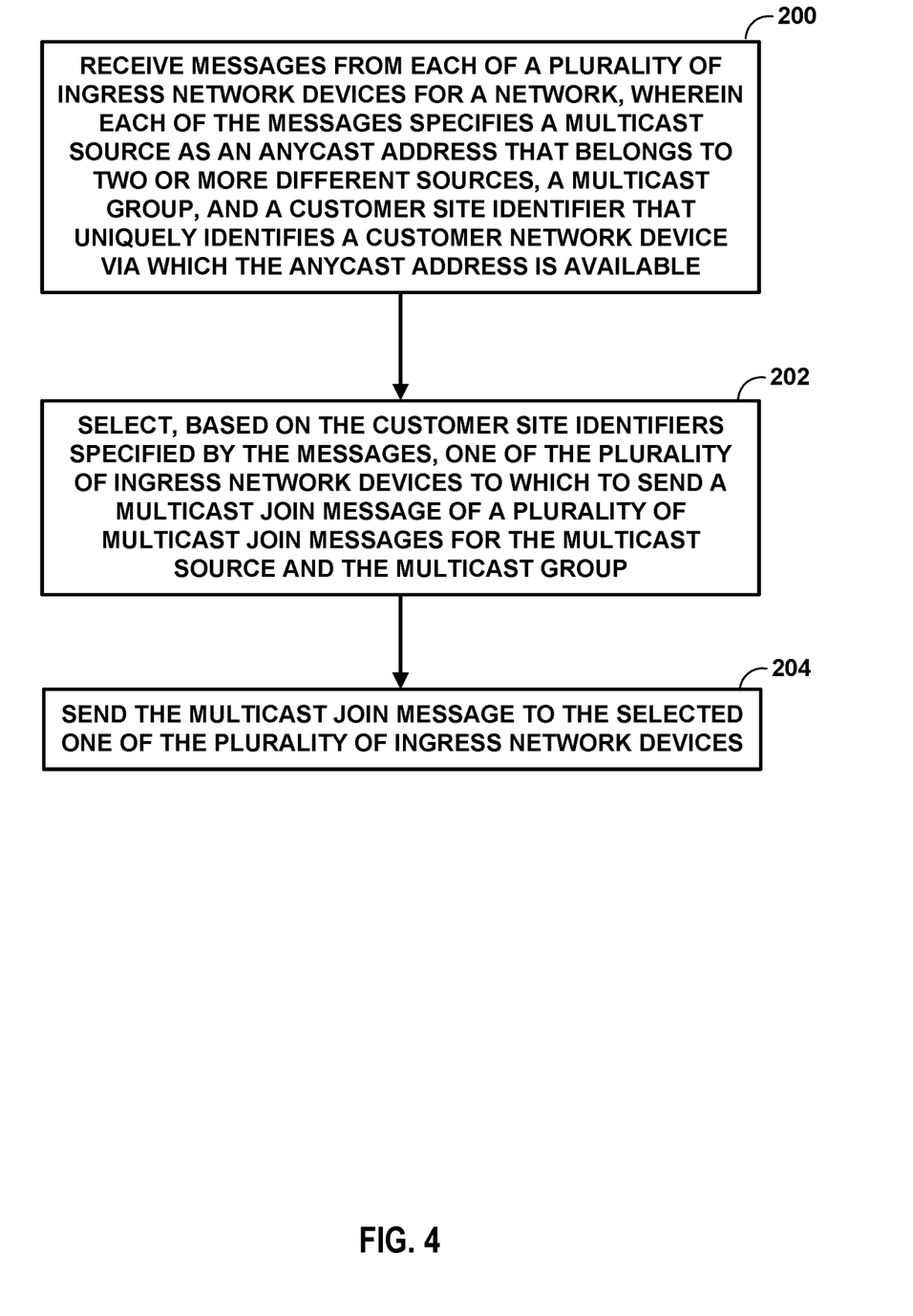
FIG. 4 is a flowchart illustrating an example operation of a network device according to the techniques of this disclosure.

FIG. 4 is a flowchart illustrating an example operation of a network device according to the techniques of this disclosure. Network device 50 may receive messages from each of a plurality of ingress network devices for the network, wherein each of the messages specifies a multicast source as an anycast address that belongs to two or more different sources, a multicast group, and a customer site identifier that uniquely identifies a customer network device via which the anycast address is reachable (200). For example, network device 50 (e.g., egress PE router 20E of FIG. 1) may receive Type-1 and/or Type-5 routes from ingress PE routers 20A-20D. The Type-1 and/or Type-5 routes may each specify an IP address associated with two or more different anycast source devices (e.g., anycast source devices 12A and 12B). The Type-1 and/or Type-5 routes may each also specify a multicast group, such as an MVPN. The Type-1 and/or Type-5 routes may each also specify a customer site identifier, such as a CE router ID.

Network device 50 may select, based on the customer site identifiers specified by the messages, one of the plurality of ingress network devices to which to send a multicast join message of a plurality of multicast join messages for the multicast source and multicast group (202). For example, network device 50 may determine a source candidate list of customer site identifiers or ingress network devices. Network device 50 may number the candidates in the source candidate list starting with 0 based on the customer site identifiers or the IP addresses of the ingress network devices. Network device 50 may receive a multicast join message from receiver 18, such as multicast join message 30A. Network device 50 may apply a hash function comprising a bytewise exclusive-or operation on bytes in the Customer-Root address and the Customer-Group address of the multicast join message to obtain a result of the hash function. Network device 50 may take the results of the hash function modulo n to determine an index number, wherein n is equal to a total number of unique customer site identifiers received by the egress network device (e.g., the number of customer site identifiers in the source candidate list—2 in the example of FIG. 1). Network device 50 may select the one of ingress PE routers 20A-20D to which to send a multicast join message based on the index number. For example, network device 50 may select the ingress network device whose associated customer site identifier numbering in the source candidate list matches the index number or may select one of the ingress PE routers 20A-20D whose numbering in the source candidate list matches the index number.

Network device 50 may send the multicast join message to the selected one of the plurality of ingress network devices (204). For example, network device 50 may send multicast join message 30A to ingress PE router 20A.

In some examples, subsequent to sending the multicast join message, network device 50 may receive multicast traffic for the multicast source and multicast group from one or more of the plurality of ingress network devices in proportion to a plurality of multicast join messages sent to each ingress network device and forward the multicast traffic. For example, network device 50 may send multicast join messages 30A and 30C to ingress PE router 20A and ingress PE router 20C respectively and may receive half of the multicast traffic from ingress PE router 20A (e.g., television channels 1-50) and half of the multicast traffic from ingress PE router 20C (e.g., television channels 51-100).

In some examples, the one the plurality of ingress network devices is selected as a primary ingress network device, and network device 50 may select, based on a customer site identifier specified by a message associated with a different one of the plurality of ingress network devices, the different one of the plurality of ingress network devices as a backup ingress network device to which to send a multicast join message of a plurality of multicast join messages for the multicast source and multicast group. Network device may send the multicast join message to the selected backup ingress network device. In these examples, a customer site identifier specified by a message associated with the primary ingress network device is different than the customer site identifier specified by the message associated with the backup ingress network device.

In some examples, as part of selecting the primary ingress network device, network device 50 may determine a source candidate list based on the customer site identifiers. As part of selecting the backup ingress network device, network device 50 may trim the source candidate list based on a customer site identifier associated with the primary ingress network device. Network device 50 may select one of the one or more of the plurality of ingress network devices, based on the trimmed source candidate list, to which to send a multicast join message based on the index number.

In some examples, network device 50 may receive a first plurality of flows from the primary ingress network device (e.g., ingress PE router 20A) in response to the multicast join message (e.g., multicast join message 30A) sent to the primary ingress network device. Network device 50 may receive a second plurality of flows from the backup ingress network device (ingress PE router 20C) in response to the multicast join message (e.g., multicast join message 30C) sent to the backup ingress network device. Network device 50 may forward at least a portion of the first plurality of flows towards receiver 18. In some examples, network device 50 may forward at least a portion of the second plurality of flows towards the multicast receiver. In such examples, the at least a portion of the first plurality of flows contain first content (e.g., television channels 1-50), the at least a portion of the second plurality of flows contain second content (e.g., television channels 51-100), and the first content is different than the second content.

In some examples, the messages from each of the plurality of ingress network devices comprise auto discovery messages for the multicast source and the multicast group. In some examples, network device 50 comprises an egress provider edge router of a network, and the plurality of ingress network devices comprise a plurality of ingress provider edge routers of the network. In such examples, receiving the messages comprises receiving Border Gateway Protocol (BGP) Multicast Virtual Private Network (MVPN) auto discovery messages each comprising a BGP extended community attribute that specifies a customer site identifier.

The techniques described herein may be easily implementable, as new functionality has to be added only on the control plane, for example, in the MVPN module. The solution may be simple to operate and manage and may provide for a way of meeting customer requirements relating to load balancing, redundancy, or both load balancing and redundancy in anycast deployments.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described in this disclosure. These and other examples are within the scope of the following claims.

What is claimed is:

1. A method comprising:
    receiving, by an egress network device for a network, a plurality of messages including a corresponding message from each of a plurality of ingress network devices for the network, wherein each of the plurality of messages specifies an anycast address that belongs to two or more different multicast sources, a multicast group, and a customer site identifier that uniquely identifies a corresponding customer network device via which a corresponding multicast source of the two or more different multicast sources is reachable;
    selecting, by the egress network device and based on a plurality of customer site identifiers specified by the plurality of messages, one of the plurality of ingress network devices to which to send a multicast join message of a plurality of multicast join messages for the anycast address and the multicast group; and
    sending, by the egress network device, the multicast join message to the selected one of the plurality of ingress network devices.

2. The method of claim 1, further comprising:
    subsequent to sending the multicast join message, receiving, by the egress network device, multicast traffic of the anycast address and the multicast group from one or more of the plurality of ingress network devices in proportion to a plurality of multicast join messages sent to each ingress network device; and
    forwarding, by the egress network device, the multicast traffic.

3. The method of claim 1, wherein selecting the one of the plurality of ingress network devices comprises:

applying a hash function comprising a bytewise exclusive-or operation on bytes in a Customer-Root address and a Customer-Group address of the multicast join message to obtain a result of the hash function;

taking the result of the hash function modulo n to determine an index number, wherein n is equal to a total number of unique customer site identifiers received by the egress network device; and selecting one of the one or more of the plurality of ingress network devices to which to send a multicast join message based on the index number.

4. The method of claim 1, wherein the one the plurality of ingress network devices is selected as a primary ingress network device, the method further comprising:

selecting, by the egress network device and based on a customer site identifier specified by a message associated with a different one of the plurality of ingress network devices, the different one of the plurality of ingress network devices as a backup ingress network device to which to send a multicast join message of a plurality of multicast join messages for the anycast address and the multicast group; and sending, by the egress network device, the multicast join message to the selected backup ingress network device, wherein a customer site identifier specified by a message associated with the primary ingress network device is different than the customer site identifier specified by the message associated with the backup ingress network device.

5. The method of claim 4, wherein selecting the primary ingress network device further comprises:

determining a source candidate list based on the plurality of customer site identifiers, wherein the selecting the backup ingress network device comprises:

trimming the source candidate list based on the customer site identifier associated with the primary ingress network device to remove any source candidates having a same customer site identifier as the customer site identifier associated with the primary ingress network device; and selecting one of the one or more of the plurality of ingress network devices, from the trimmed source candidate list, to which to send a multicast join message.

6. The method of claim 4, further comprising:

receiving, by the egress network device, a first plurality of flows from the primary ingress network device in response to the multicast join message sent to the primary ingress network device;

receiving, by the egress network device, a second plurality of flows from the backup ingress network device in response to the multicast join message sent to the backup ingress network device; and forwarding, by the egress network device, at least a portion of the first plurality of flows towards a multicast receiver.

7. The method of claim 6, further comprising:

forwarding, by the egress network device, at least a portion of the second plurality of flows towards the multicast receiver, wherein the at least a portion of the first plurality of flows contain first content, wherein the at least a portion of the second plurality of flows contain second content, and wherein the first content is different than the second content.

8. The method of claim 1, wherein the egress network device comprises an egress provider edge router of a network, wherein the plurality of ingress network devices comprise a plurality of ingress provider edge routers of the network, and wherein receiving the plurality of messages comprises receiving a plurality of Border Gateway Protocol (BGP) Multicast Virtual Private Network (MVPN) auto discovery messages each comprising a BGP extended community attribute that specifies a customer site identifier of the plurality of customer site identifiers.

9. An egress network device comprising:

at least one computer processor; and a memory comprising instructions that when executed by the at least one computer processor cause the at least one computer processor to:

receive a plurality of messages including a corresponding message from each of a plurality of ingress network devices for a network, wherein each of the plurality of messages specifies an anycast address that belongs to two or more different multicast sources, a multicast group, and a respective customer site identifier that uniquely identifies a corresponding customer network device via which a corresponding multicast source of the two or more different multicast sources is reachable;

select, based on a plurality of customer site identifiers specified by the plurality of messages, one of the plurality of ingress network devices to which to send a multicast join message of a plurality of multicast join messages for the anycast address and the multicast group; and send the multicast join message to the selected one of the plurality of ingress network devices.

10. The egress network device of claim 9, wherein the instructions that when executed by the at least one computer processor further cause the at least one computer processor to:

subsequent to sending the multicast join message, receive multicast traffic of the anycast address and the multicast group from one or more of the plurality of ingress network devices in proportion to a plurality of multicast join messages sent to each ingress network device; and forward the multicast traffic.

11. The egress network device of claim 9, wherein as part of selecting the one of the plurality of ingress network devices, the instructions that when executed by the at least one computer processor cause the at least one computer processor to:

apply a hash function comprising a bytewise exclusive-or operation on bytes in a Customer-Root address and a Customer-Group address of the multicast join message to obtain a result of the hash function;

take the result of the hash function modulo n to determine an index number, wherein n is equal to a total number of unique customer site identifiers received by the egress network device; and select one of the one or more of the plurality of ingress network devices to which to send a multicast join message based on the index number.

12. The egress network device of claim 9, wherein the one the plurality of ingress network devices is selected as a primary ingress network device, and wherein the instructions that when executed by the at least one computer processor further cause the at least one computer processor to:

select, based on a customer site identifier specified by a message associated with a different one of the plurality of ingress network devices, the different one of the plurality of ingress network devices as a backup ingress network device to which to send a multicast join message of a plurality of multicast join messages for the anycast address and the multicast group; and send the multicast join message to the selected backup ingress network device, wherein a customer site identifier specified by a message associated with the primary ingress network device is different than the customer site identifier specified by the message associated with the backup ingress network device.

13. The egress network device of claim 12, wherein as part of selecting the primary ingress network device, the instructions that when executed by the at least one computer processor cause the at least one computer processor to:

determine a source candidate list based on the plurality of customer site identifiers, wherein as part of selecting the backup ingress network device, the instructions that when executed by the at least one computer processor cause the at least one computer processor to:

trim the source candidate list based on the customer site identifier associated with the primary ingress network device to remove any source candidates having a same customer site identifier as the customer identifier associated with the primary ingress network device; and select one of the one or more of the plurality of ingress network devices, from the trimmed source candidate list, to which to send a multicast join message.

14. The egress network device of 12, wherein the instructions that when executed by the at least one computer processor further cause the at least one computer processor to:

receive a first plurality of flows from the primary ingress network device in response to the multicast join message sent to the primary ingress network device;

receive a second plurality of flows from the backup ingress network device in response to the multicast join message sent to the backup ingress network device; and forward at least a portion of the first plurality of flows towards a multicast receiver.

15. The egress network device of claim 14, wherein the instructions that when executed by the at least one computer processor further cause the at least one computer processor to:

forward at least a portion of the second plurality of flows towards the multicast receiver, wherein the at least a portion of the first plurality of flows contain first content, wherein the at least a portion of the second plurality of flows contain second content, and wherein the first content is different than the second content.

16. The egress network device of claim 9, wherein the messages from each of the plurality of ingress network devices comprise auto discovery messages for the anycast address and the multicast group.

17. The egress network device of claim 9, wherein the egress network device comprises an egress provider edge router of a network, wherein the plurality of ingress network devices comprise a plurality of ingress provider edge routers of the network, and wherein receiving the messages comprises receiving Border Gateway Protocol (BGP) Multicast Virtual Private Network (MVPN) auto discovery messages each comprising a BGP extended community attribute that specifies a customer site identifier of the plurality of customer site identifiers.

18. A non-transitory computer-readable storage medium encoded with instructions that, when executed, cause at least one processor of a computing device to:

receive a plurality of messages including a corresponding message from each of a plurality of ingress network devices for a network, wherein each of the plurality of messages specifies an anycast address that belongs to two or more different multicast sources, a multicast group, and a respective customer site identifier that uniquely identifies a corresponding customer network device via which a corresponding multicast source of the two or more different multicast sources is reachable;

select, based on a plurality of customer site identifiers specified by the plurality of messages, one of the plurality of ingress network devices to which to send a multicast join message of a plurality of multicast join messages for the anycast address and the multicast group; and send the multicast join message to the selected one of the plurality of ingress network devices.

19. The non-transitory computer-readable storage medium of claim 18, wherein as part of selecting the one of the plurality of ingress network devices, the instructions that, when executed, cause the at least one processor of the computing device to:

apply a hash function comprising a bytewise exclusive-or operation on bytes in a Customer-Root address and a Customer-Group address of the multicast join message to obtain a result of the hash function;

take the result of the hash function modulo n to determine an index number, wherein n is equal to a total number of unique customer site identifiers received by an egress network device; and select one of the one or more of the plurality of ingress network devices to which to send a multicast join message based on the index number.

20. The egress network device of claim 9, wherein the customer site identifier comprises one of: a customer router device identifier, a customer edge site identifier, or an identifier generated based on a combination of an autonomous system number and a site identifier.

* * * * *